United States Patent [19]
Hägerstedt

[11] Patent Number: 5,114,587
[45] Date of Patent: May 19, 1992

[54] METHOD OF SEWAGE TREATMENT

[75] Inventor: Lars-Erik Hägerstedt, Stekelvägen, Sweden

[73] Assignee: Hydro Supra AB, Landskrona, Sweden

[21] Appl. No.: 602,258

[22] PCT Filed: Feb. 3, 1989

[86] PCT No.: PCT/SE89/00039
§ 371 Date: Jan. 4, 1991
§ 102(e) Date: Jan. 4, 1991

[87] PCT Pub. No.: WO89/10898
PCT Pub. Date: Nov. 16, 1989

[30] Foreign Application Priority Data

May 9, 1988 [SE] Sweden ............................ 8801736

[51] Int. Cl.$^5$ ................................................ C02F 1/72
[52] U.S. Cl. ................................... 210/614; 210/627; 210/631; 210/747; 210/758; 210/903
[58] Field of Search ........ 210/614, 620, 627, 629–631, 210/721, 746, 758–760, 903, 908, 747

[56] References Cited

U.S. PATENT DOCUMENTS

| | | | |
|---|---|---|---|
| 3,335,082 | 8/1967 | Ullrich | 210/15 |
| 3,525,685 | 8/1970 | Edwards | 210/15 |
| 3,705,098 | 12/1972 | Shepherd et al. | 210/63 |
| 4,911,843 | 3/1990 | Hunniford et al. | 210/631 |

FOREIGN PATENT DOCUMENTS

| | | |
|---|---|---|
| 0001792 | 6/1979 | European Pat. Off. |
| 143214 | 9/1980 | Norway |
| 7510171 | 9/1975 | Sweden |

OTHER PUBLICATIONS

Itou, "Concentrating method for sludge", Patent Abstract 108 C 59, 1979, (JP 56-38196).
Sekikawa, "Purification of organic waste water by activated sludge", Chemical Abstracts, vol. 81, 1974, p. 208 (16507d).

*Primary Examiner*—Thomas Wyse
*Attorney, Agent, or Firm*—Ladas & Parry

[57] ABSTRACT

The present invention refers to a process for wastewater treatment, wherein the amount of soluble organic matter is reduced by means of addition of nitrate. A relief of the wastewater treatment plants is obtained by the fact that the agent is added as early as possible in the pipe line net. The addition of nitrate may be controlled by measurement of the redox potential.

5 Claims, No Drawings

METHOD OF SEWAGE TREATMENT

FIELD OF THE INVENTION the present invention relates to treatment of different kinds of wastewater, wherein the amount of dissolved organic compounds by addition of nitrate compounds is reduced as well as the fact that formation of hydrogen sulphide is prevented.

PRIOR ART

Treatment of wastewater is as an important and costly operation in society. Several methods are developed and at work. Municipal wastewater is characterized by the composition of mainly the following parts:
toilet water
bathing, washing and cleaning water from households
various industrial waste waters
surface water Municipal wastewater is characterized by the following data:
flow: 0.3-0.5 m$^3$/person and day
COD: 0.2-0.5 kg COD/m$^3$
BOD$_7$: 0.1-0.2 kg BOD$_7$/m$^3$
TSS: 0.05-0.25 kg TSS/m$^3$
temperature: 5-20° C.
Kjeldahl-N: 20-50 g N/m$^3$
total-P: 3-5 g P/m$^3$ BOD$_7$ refers to biological oxygen demand which said used as a measure of the content of easily degradable organic matter in the water.

The FIG. 7 indicates that it is the oxygen demand during seven days in a sample kept in darkness at 20° C. which is intended. TSS refers to total suspended solid sand designates the amount of non-solved constitutents in water or sludge. Chemical oxygen demand is called COD and defines the consumption of a certain oxidation agent, converted into oxygen demand, at oxidation of mainly organic materials in water under specified conditions. Kjeldahl-N defines that the content of nitrogen is determined according to Kjeldahl's method.

Society of today has gradually increased its demands for treatment of wastewater. At present there are demands >90 percent reduction of BOD$_7$, TSS and phosphorus for municipal wastewater. Increasing demands and a large-scale production advantages have led to the building of large, centrally placed, wastewater. Increasing demands and large-scale production advantages have led to the building of large, centrally placed, wastewater treatment plants in many municipals. This has resulted in extensive pipe line systems for transport of wastewater fro the more peripheral parts of the municipals up to the wastewater treatment plant. In many cases the time of residence can be 1 to 2 days in the pipe line system. Thereby poisonous and corrosive hydrogen sulphide is formed under anaerobic conditions.

In spite of the fact that many different methods for treatment of municipal wastewater have been developed, the present technique might roughly be divided into the following partial steps:
coarse cleaning through screen
sand sifter
pre-sedimentation
biological treatment, often active sludge
phosphorus precipitation by chemical precipitation/flocculation.

In order to increase the efficiency of the wastewater treatment plants chemical precipitation has more and more been used in connection with pre-sedimentation, so-called pre-precipitation, whereby almost all particularly bonded pollutants can be separated. However, solved BOD is not separated to any larger extent. The sludge separated from presedimentation and biological treatment is often stabilized by means of digestion in a digester, whereby inter alia methane gas is formed. The gas is usually flared but in recent years it has more and more begun to be used for energy production.

DESCRIPTION OF THE INVENTION

The object of the present invention is to reduce the amount of organic pollutants, especially oxygen demanding substances, in an early stage, and/or to prevent that solid pollutants are transmitted into a solution phase. This gives an overall better treatment and reduces the load of the subsequent steps, which increases the possibilities for additional connections and/or new treatment processes.

The proposed process is based on the following assumptions:

1. The wastewater contains organic pollutants mainly as solids, wherein only a part of the biochemical oxygen demanding material is present in a soluble form.
2. The wastewater is given such a long time of residence before the final treatment step that added nitrate will have time to be consumed, preventing the total nitrogen amount in the effluent to be increased by the addition.
3. Great demands are called for at the treatment of wastewater, especially concerning BOD$_7$, TSS, N and P.

At the process according to the invention the pipe line net or other residing volume are exploited for the following purposes:

1. To reduce soluble oxygen demanding matter.
2. To prevent transformation (degradation) of solid organic matter to solved or colloidal compounds which are difficult to separate.
3. To reduce soluble organic phosphorus and nitrogen.

The method can be used i larger sewer nets, in average sized or large wastewater treatment plants, in smaller wastewater treatment plants, in wastewater plants for single households or in connection with the handling of sludge in transport vehicles as well as for industrial wastewaters with a high amount of oxygen demanding matter.

The effect is achieved by addition of an active oxidation agent, viz. nitrate in as in the form of calcium or other nitrates or in the form of nitric acid, early or successively in the pipe line system, possibly in combination with measures in order to control the time of residence and the microorganism flora in the pipe line net by means of recirculation, damping, extra volume, graft, etc. A suitable way of adding the nitrate is in the form of a solution. The nitrate may also be combined with other oxidation agents, e.g. trivalent iron, air or oxygen or a combination of these, to mention some examples. By addition of oxidation agents the microbial activity in the pipeline net is stimulated and a certain amount of the oxygen-consuming substance is oxidized or transmitted to sludge particles. The result will be a reduction of mainly soluble BOD. In addition, a reduction of soluble organic phosphorus by means of a transformation to PO$_4$-P takes place in the pipeline net or in other retentive volumes. This entails that a more effective phosphorus precipitation is obtained in the chemical precipitation step of the wastewater treatment plant. The normal transformation from soluble organic nitrogen to ammonium nitrogen is also increased.

By means of this process a great part of the activity, which otherwise takes place in the wastewater treatment plant is transferred to the pipe line net. The process increases the capacity and gives more stale operation conditions in the wastewater treatment plant by the fact that the aerobic biological activity is accelerated. The wastewater treatment plant is thereby given an essential relief with, as well as without pre-precipitation.

The result is a very good total pollution reduction. In this way the need of energy for aeration also maybe reduced. By means of the choice of oxidation agent and/or precipitation chemicals, the addition of chemicals, the pre-precipitation or totally, can be reduced. The invention gives opportunities of new combinations of known technique and of new concepts for wastewater treatment. It also increases the possibilities of additional treatment, e.g. nitrogen reduction.

The amount of nitrate which is required for a good result is important and the addition of nitrate can be controlled according to the residence time in the net, by analyzing TOC (total organic carbon), COD or redox potential.

I claim:

1. A process for waste water or sewage purification treatment comprising chemical precipitation, biological purification and application of added nitrate, wherein the improvement comprises nitrate being added at an early stage at least at one point in a pipe line system transporting waster water or sewage to a final treatment unit and that the amount of nitrate is regulated by monitoring oxygen demanding matter ahead of the final treatment unit.

2. The process according to claim 1, wherein the nitrate is added together with other oxidizing agents selected for the group consisting of oxygen, air, trivalent iron and mixtures thereof.

3. The process according to claim 1, wherein sufficient residence time in the pipe line system is secured by means of repumping or recirculation or by supplying extra volume in the pipe line system.

4. The process according to claim 1, wherein the amount of nitrate is regulated by monitoring oxygen demanding matter or redox potential ahead of the final treatment unit for securing that substantially all of the added nitrate is consumed before the sewage enters the final treatment unit.

5. The process according to claim 1, wherein an oxidizing agent is added in an amount sufficient for also reducing dissolved organic nitrogen.

* * * * *